Figure 1:
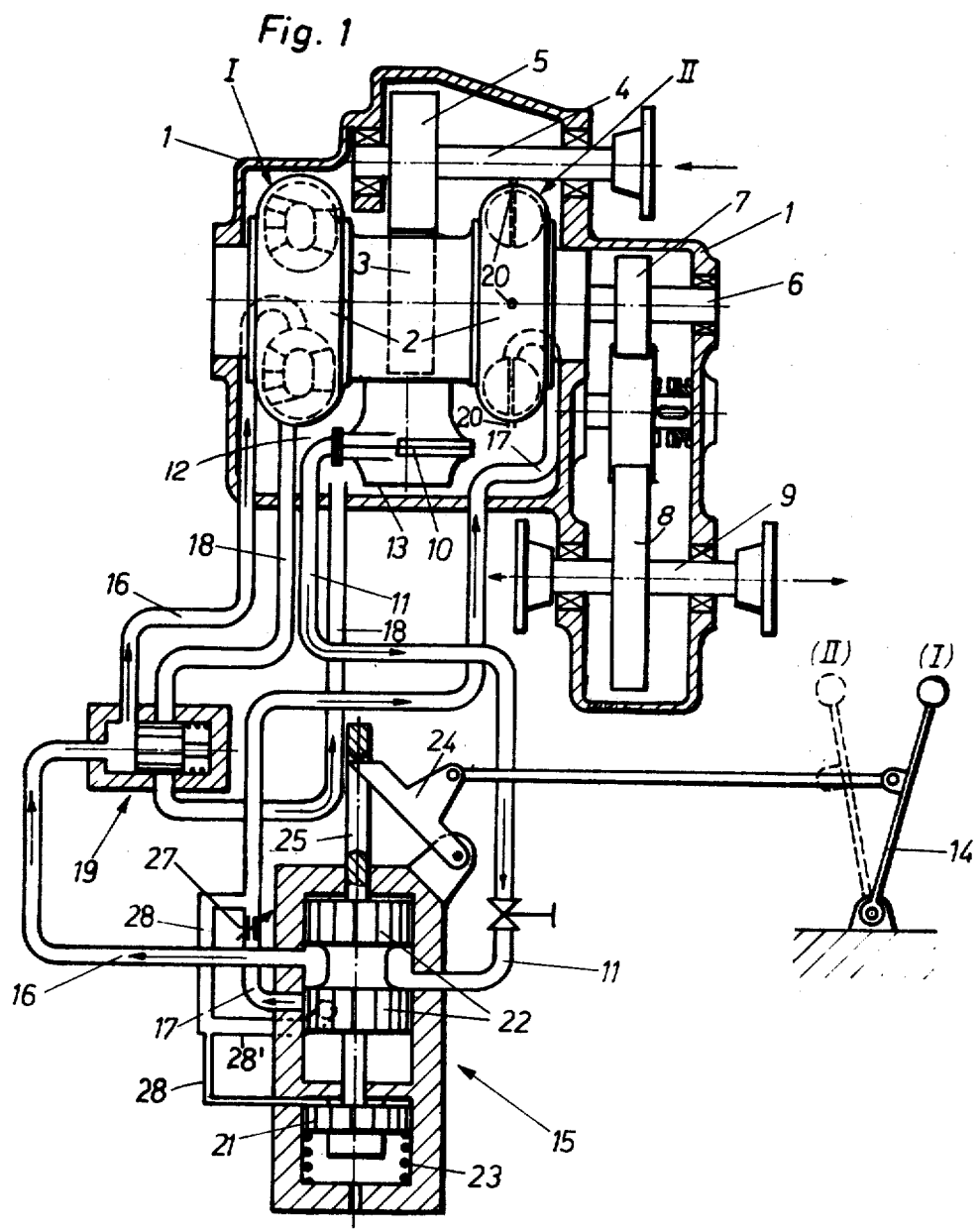

United States Patent
Gruschka et al.

[15] 3,691,768
[45] Sept. 19, 1972

[54] METHOD OF AND SYSTEM FOR CHANGING THE TRANSMISSION RATIO OF A HYDRODYNAMIC VEHICLE TRANSMISSION

[72] Inventors: Bernhard Gruschka; Berthold Herrmann, both of Heiden Heim-Schnaitheim, Germany

[73] Assignee: Voith Getriebe KG, Heidenheim/Brenz, Germany

[22] Filed: Dec. 29, 1970

[21] Appl. No.: 102,343

[30] Foreign Application Priority Data
Dec. 31, 1969 Germany..........P 19 65 685.0

[52] U.S. Cl..................................................60/54
[51] Int. Cl..................................................F16d 33/00
[58] Field of Search..........................................60/54

[56] References Cited

UNITED STATES PATENTS

| | | |
|---|---|---|
| 2,018,616 | 10/1935 | Martyrer et al.................60/54 |
| 2,067,793 | 1/1937 | Seibold.....................60/54 X |

*Primary Examiner*—Edgar W. Geoghegan
*Attorney*—Edwin E. Greigg

[57] ABSTRACT

A method of providing switching from torque converter engagement to fluid coupling engagement in a hydrodynamic vehicle transmission having a plurality of working circuits, whereby at least during changing from torque converter engagement to fluid coupling engagement, the pressurized working circuit is maintained in a pressurized condition while the unpressurized working circuit is filled with pressure medium with controlled speed. Said pressurized condition is maintained until an appropriate pressurization of said latter work circuit has been attained, at which moment the first-named working circuit is depressurized.

5 Claims, 2 Drawing Figures

METHOD OF AND SYSTEM FOR CHANGING THE TRANSMISSION RATIO OF A HYDRODYNAMIC VEHICLE TRANSMISSION

The invention relates to a method for changing the transmission ratio of a hydrodynamic vehicle transmission having at least one Fottinger torque converter and at least one Föttinger fluid coupling for speeds above the output speed range of the torque converter.

The present invention is based on the problem that it is not always possible in a hydrodynamic transmission with a plurality of working circuits, of which the circuit intended for the highest speed range is constructed as a hydrodynamic coupling, to provide satisfactory switching with conventional control means from torque converter engagement to fluid coupling engagement.

In conventional control systems it has always been the endeavor to achieve an "overlap" and this has in fact been achieved, on the one hand in order to avoid as far as possible any interruption in the traction force and, on the other hand, in order to enable the prime mover to continue operation at constant load. In modern gas turbines, which are provided as prime movers in modern transmission systems, for example for rail vehicles, the speeds which occur on the e input side of the transmission are very high so that the rotational energy in the gear wheels and transmission parts disposed on the input side liberate substantial inertial forces if short-period speed changes are imposed. These forces are of such a magnitude that in extreme cases they may exceed the strength of the components concerned. The difficulty in changing from torque converter engagement to fluid coupling engagement is due to the fact that the fluid coupling is filled too rapidly (a fluid coupling has more reaction to the input side than conventional torque converters for rail vehicles), and since its characteristic is rigid compared to the torque converter, the prime mover is decelerated too rapidly to a lower speed of rotation corresponding to the speed of travel (changing to a higher fixed transmission ratio results in a drop in speed corresponding to the change in ratio). The high-speed transmission parts on the input side or the driving gas turbine do not tolerate an excessive filling rate and thus an excessive reduction of the speed of rotation. It is feasible to prolong the period during which the fluid coupling is filled, for example by appropriate throttling of the filling flow. By employing this method, it is in fact possible to adjust the changing of ratio so that the fluid coupling does not fill too rapidly and, on the other hand, the torque converter is not emptied too early. Thus, one can avoid that the gas turbine be load released and that then suddenly its speed be uncontrollably increased against the initially small resistance of the slowly filling coupling and—when the fluid coupling is almost filled—that it be decelerated by a very large drop in speed. However, such an adjustment is possible only as to a single input speed and is practically useless since ratio changing must be possible at different input speeds. To influence the extent of adjustment by means of the input speed is feasible, but on the one hand is too complicated and costly and, on the other hand, is prone to malfunctioning. A failure of the adjustment system would under certain circumstances destroy the entire prime mover and the input part of the transmission.

It is an object of the invention to provide an improved method of changing the transmission ratio of a hydrodynamic vehicle transmission of the type described hereinabove, wherein in the entire rpm range, the new rpm is impressed upon the prime mover in a controllable period without the necessity of providing expensive additional structures.

Briefly stated, according to the invention, at least when changing the ratio to engage the fluid coupling, the working circuit to be rendered operative is appropriately pressurized before depressurizing the working circuit previously engaged.

It may first appear unfeasible that two hydrodynamic transmission units, designed for different speeds, can operate simultaneously, since one might fairly assume that double engagement of two different units on the input side would result in deceleration of the engine owing to reactive power absorption within the transmission. However, it was found that double engagement of a torque converter and a fluid coupling is not necessarily accompanied by such power absorption and therefore does not necessarily involve such deceleration of the engine. The drive side can be gradually decelerated to an input speed corresponding to the speed of travel and the relatively fixed transmission ratio, due to the controlled filling of one of the working circuits and the reaction of the filling or filled working circuit. Under these conditions, both the torque converter and the fluid coupling participate positively in the traction. The fluid coupling operates with a positive slip of a few percent and the torque converter operates with a power consumption that corresponds to the suppressed rotational input speed and contributes correspondingly to apply traction. There is no mutual disturbance; on the contrary, since the traction power is transmitted by two units adapted to operate in parallel, part of the power is transmitted by the unit operating with torque converter efficiency and the remainder of the power is transmitted by the unit having the well-known high degree of fluid coupling efficiency (100 percent minus slip). Consequently, the resultant overall efficiency during double engagement will be at some point between the two efficiencies, that is to say, higher than the efficiency of the torque converter. Emptying the torque converter after double engagement causes the efficiency to rise to that of the fluid coupling alone. Owing to the lack of reaction of the torque converter when power is transmitted from the input part of the transmission to the output part thereof, no considerable increase in the prime mover speed by the driving wheels is caused when changing from fluid coupling engagement back to torque converter engagement. For this reason, double engagement of the two working circuits is not generally required when changing down, but it is perfectly feasible to perform such operation.

According to the invention, there is provided a hydrodynamic vehicle transmission having at least one Föttinger torque converter for the lower or medium speed of travel and a Föttinger fluid coupling for the upper speed of travel, and having an improved transmission ratio changing control system. The latter includes a valve arrangement operative when changing from torque converter engagement to fluid coupling engagement. The valve arrangement permits complete pressurization of the working circuit of the fluid coupling while the working circuit of the torque converter is still pressurized before starting depressurization of the torque converter working circuit.

The valve arrangement preferably starts depressurization of the torque converter when the pressure of the working circuit of the fluid coupling builds up, i.e., when this circuit is completely filled. To ensure that the fluid coupling is filled in the desired, i.e., not too rapid, manner, and to ensure that the deceleration sensitive, high-speed parts of the transmission are slowed down within a controllable period of time, the valve arrangement may include an adjustable throttle which remains constant while the fluid coupling is being filled and pressurized.

According to the invention, the valve arrangement may be switching valve for conducting the pressure fluid from filling pump to the torque converter working circuit, to the fluid coupling working circuit, or to both. The switching valve is operably by at least one shifting piston governed by a shift controller. To obtain hydraulic operation of the double engagement system, according to one preferred embodiment of the invention, a relief port provided in the wall of the valve and positioned adjacent to the path of the shifting piston, is opened, as the shifting piston pushes the control member of the valve against a compression spring in the opposite end of the valve. The pressure chamber of the shifting piston will then be connected to an unpressurized duct connected to an automatic stop valve. The position of the relief port is preferably adjustable along the path of the shifting piston, so that the switching valve can throttle the communication between the fluid coupling working circuit and the filling pump to such an extent as is necessary for a predetermined filling time. The position of the relief port should be so adjusted that the leading edge of the control member of the switching valve for controlling the fluid coupling working circuit may controllably restrict the flow passage section of the filling connection of the circuit to thus obtain a suitable filling time. The stop valve closes when the fluid coupling working circuit is completely filled, i.e., pressurized. The invention may thus be used in conventional transmissions and their auxiliary apparatus in a simple manner and without excessive design expenses.

Figure 2:
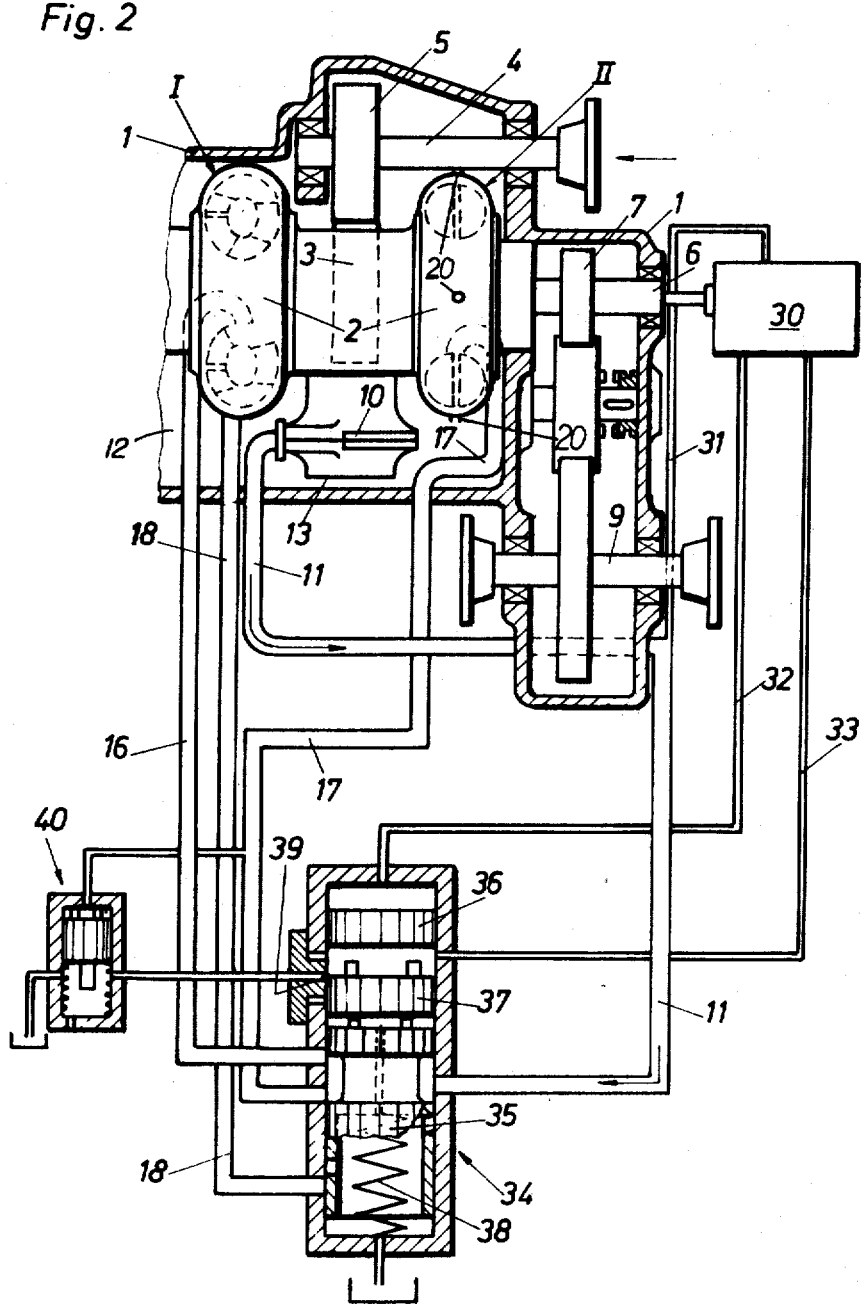

The invention will be better understood from the ensuing detailed specification of two embodiments taken in conjunction with the drawings, in which:

FIG. 1 is a schematic view, partly in section, of a rail vehicle transmission provided with a fluid torque converter intended for the lower speed range and a fluid coupling intended for traveling speed, also showing the control parts required for manually operated ratio changing; and FIG. 2 is a view, partly in section, of a similar transmission, designed for automatic and hydraulically initiated ratio changing.

In FIG. 1, the casing of the transmission is shown hatched and is designated with the numeral 1. A torque converter I and a fluid coupling II are disposed coaxially and adjacent to each other and are separated by a gear wheel stage and are incorporated in a separate housing 2 inserted into the transmission casing 1. The two fluid circuits have a common hollow pump impeller shaft connected to a driving pinion 3 and driven by a prime mover, in particular a gas turbine, not shown, through an input shaft 4 and an input gear wheel 5. A central turbine shaft 6, common to both fluid circuits, is disposed coaxially in the pump impeller shaft and extends on the right from the housing 2 of the hydrodynamic transmission unit and is provided at that location with a turbine shaft output pinion 7. The driving power is transferred from the turbine shaft driving pinion 7 through a reducing and reversing transmission 8 to an output shaft 9 from which it is transmitted to the locomotive driving axles, which are not shown. A filling pump 10, driven from the transmission input side and provided with a delivery line 11 and a suction inlet 13 disposed below the liquid level of an oil sump 12, is mounted on an intermediate member which couples the casing of the torque converter I and the fluid coupling II to the casing 2 of the hydrodynamic transmission unit. The delivery line 11 extends to a control or switching valve 15 which is displaceable by means of a hand lever 14, adapted to be moved into either of two end positions. A torque converter filling line 16 and a fluid coupling filling line 17 branch off from the control valve 15 and issue into the respective working circuits at a location of low pressure. Discharge ducts or apertures are disposed in the circuits at locations of high pressure. Thus, a discharge duct 18 associated with the torque converter I extends from the converter with the interposition of a stop valve 19 (FIG. 1) to a point upstream of the suction inlet 13 of the filling pump 10. The discharge means for the fluid coupling II is constituted by discharge restrictor nozzles 20 which are constantly open and adapted to discharge into the interior of the transmission.

The switching valve 15 shown in FIG. 1 has a control piston 22 which is operable, on the one hand, by the hand lever 14 and, on the other hand, by a shifting piston 21. The control piston 22 is continuously urged into its upper position by a spring 23. When the control piston 22 is in its upper position, as indicated in FIG. 1, only the converter filling duct 16 is connected with the filling duct 11 of the pump 10. This upper position of piston 22 may be obtained by moving the hand lever 14 to pivot a control finger 24, engaging in a slotted piston rod 25. An intermediate position of the control piston 22 is obtained when the control finger 24 is pivoted into contact with the valve housing against the force exerted by the spring 23 whereby the piston rod 25 is moved until the lower end of the rod slot is flush with the face of the housing. In this intermediate position, both the filling lines 16 and 17 communicate through the valve 15 with the delivery line 11 extending from the pump 10. Both working circuits can now be filled or the filling step maintained. In the lowest position, which is obtained by exerting a sufficient pressure of the shifting piston 21 against the force of the spring 23, the filling line 16 for the torque converter I will be disconnected from the delivery line 11 of the filling pump 10 and only the filling line 17 for the fluid coupling II will be connected to the pump 10.

The method of operation of the control system illustrated in FIG. 1 is briefly as follows, simplified in its essential features: In the illustrated position, in which the torque converter filling line 16 is connected to the pump 10, the filling pressure causes the piston of the stop valve 19 to be displaced into the operating position in which the filling duct 16 opens and the discharge duct 18 closes. Thus, the torque converter I is now being filled. If the ratio is to be changed from the torque converter I to the fluid coupling II, the hand lever 14 is moved as far as possible to the left into the position (II), whereupon the control piston 22 will assume the previously described intermediate position, in which both working circuits I and II are connected to the filling pump. The fluid coupling II will begin to fill in addition to the torque converter I. The period of time during which this operation takes place is defined by an adjustable throttle 27 disposed in the fluid coupling filling line 17. The filling time, that is, the time necessary for a build-up of torque based on increasing filling of the fluid coupling II, is determined by such a deceleration value that is still tolerable to ensure the safety of the high-speed transmission parts disposed on the input side. Thus, for example, calculations or tests may indicate that a certain torque to be transmitted must be reached only after 4 seconds. Then the throttle 27 is adjusted accordingly. The filling pressure, which is generated by the pump 10, will be built up in the fluid coupling II and in the filling line 17 only after the filling step for the coupling is completed. From the line 17, downstream of throttle 27, there extends a sensor conduit 28 to the shifting piston 21 transmitting thereto an "end of filling" signal as the pressure increases in line 17. Due to the pressure increase upon completion of the filling of the fluid coupling, the control piston 22 is pulled by the shifting piston 21 against the force of spring 23 into the lowest position in which the torque converter filling line 16 is shut off from the pump 10, while the fluid coupling filling line 17 is connected thereto. In order to maintain and ensure a reliable filling of the fluid coupling II after the aforedescribed shifting operation is completed, a port for a duct 28' bypassing the throttle 27 is opened by the control piston 22 when it moves into its position. After the ratio changing operation, the pressure in the line 16 will be reduced and the return spring of the stop valve 19 is able to move its piston into the inoperative position in which the torque converter discharge duct 18 is opened.

It is seen that the manual shifting command first only causes the control piston to be moved into an intermediate position in which both circuits are filled or maintained filled. The ratio shifting operation is completed automatically only after an "end-of-filling" signal is applied to shifting piston 21.

By virtue of the above-described measure, it is possible under all operating conditions to reliably control the speed with which the new coupling ratio takes up the load and the speed with which the driving side adapts itself to the output conditions, which are fed back through the coupling.

In the embodiment illustrated in FIG. 2, the changing of transmission ratio is performed hydraulically and automatically. To a shift controller 30 there are applied, by means of filling pump conduit 31, an input speed responsive signal. The two signals are compared in shift controller 30 and, accordingly, pilot line 32 or pilot line 33, both extending from shift controller 30, is pressurized. The line 32 is pressurized when the torque converter I is operative and the line 33 is pressurized when the fluid coupling II is engaged.

Feeding control of the flow circuits is performed by a switching valve 34 which is provided with three pistons reciprocable in a cylinder. The lowest of the pistons is a main control piston 35. The two pistons 36 and 37 disposed above piston 35, are the shifting pistons for the main control piston when the torque converter I or fluid coupling II are filled. The respective pressures generated and transmitted along the lines 32 and 33 are of different magnitudes. The pressure in the pressurized torque converter pilot line 32 is lower than that of the fluid coupling pilot line 33, when the latter is pressurized, so that the position of equilibrium of the three pistons 35, 36, and 37, which adjusts itself due to the action of the increasing force of a spring 38, varies depending on the shifting command.

The operation of the switching valve 34 is as follows: When the two lines 32 and 33 are unpressurized, the three pistons are moved by the spring 38 into their uppermost position. The control piston 35 connects the delivery line 11 of the filling pump 10 and the torque converter discharge line 18 to the oil sump 12. Upon a shifting command for the torque converter ratio, the pressure in line 32 will be such that the position of equilibrium of the main control piston 35 changes and opens only the connecting port of the torque converter filling line 16 by means of the groove between the upper and lower control edge of the main control piston 35. Thus, communication is established between the pump pressure line 11 and the torque converter filling line 16, while the torque converter discharge duct 18 remains blocked. When the pilot line 33 for the fluid coupling ratio is pressurized, the pressure therein will be higher than that prevailing previously in the line 32 so that the spring 38 is further compressed and the main control piston 35 is moved by the piston 37 to a lower position of equilibrium.

A port 39 connects the pressure chamber of the piston 37 to the sump when a self-opening stop valve 40 is in the inoperative state; the port 39, which is in the cylinder guiding the piston 37, is adjustable in the direction of movement of the piston 37 and can be closed by the piston 37. The upper edge of the piston 37 will "stick" to the port 39 and in this position will function as a pressure limiting valve. The incoming control oil will lose its pressure; no further motion can now take place because any increase in the piston force is prevented. By virtue of the position of the port 39, the main control piston 35 is retained in a defined intermediate position. This position may be controlled by adjustment of the port 39, so that the lower control edge of the main control piston exposes as much cross section of the filling connection for the fluid coupling II as is required for a suitably slow filling time, taking into account also the amount of fluid which is constantly ejected from the nozzles 20. Thus, by precise vertical adjustment of the port 39, it is possible to adjust the cross-sectional area of the filling conduit for the fluid coupling and hence setting its filling period. An increase of the primary rpm will also increase the amount of fluid ejected from the casing rotating therewith on the primary side, but the filling pressure of the filling pump 10, also driven on the primary side, will rise correspondingly. Thus, the effective filling time will remain constant despite speed fluctuations.

When the main control piston is in the intermediate position defined by the position of the port 39, the filling line 16 for the torque converter I will be open to such an extent that the filling pressure in the torque converter can still be reliably maintained; the torque converter discharge line 18 is entirely closed in the intermediate position.

When the fluid coupling II is completely filled, the pressure in the filling line 17 will rise. This increase in pressure is utilized to close the stop valve 40. This renders the port 39 ineffective as to the positioning of the shifting piston 37 and consequently the control pressure in the line 33 is able to move the main control piston 35 into the lowest position due to the pressure rise above the piston 37. In this position, the torque converter filling line 16 is blocked by the upper control edge of the main control piston 35 and the torque converter discharge line 18 will be opened. The fluid coupling filling line 17 will be connected with its full cross-sectional area to the delivery line 11 of the filling pump 10 and the filling pressure may thus be maintained in the filling line 17. The stop valve 40 is in its operative position as long as the fluid coupling II is filled.

When the pressure in the fluid coupling pilot line 33 is reduced and when the pressure in the torque converter pilot line 32 increases correspondingly, that is to say, when a command is given to change from the fluid coupling to the torque converter, the main control piston 35 will immediately move from the lowest position into the corresponding upper position of equilibrium in which only the connections for filling the torque converter I are open and only the connections for its discharge are closed.

Thus, the control piston of the second embodiment, too, is first moved into an intermediate position in which both working circuits are filled. Ratio changing by disengaging the torque converter working circuit is automatically completed only after the fluid coupling working circuit is completely filled or pressurized.

That which is claimed is:

1. A method of changing the transmission ratio in a hydrodynamic vehicle transmission of the type that includes at least one Föttinger torque converter with an associated torque converter working circuit and at least one Föttinger fluid coupling with an associated fluid coupling working circuit, said fluid coupling being designed for speeds above the output speed range of said torque converter, comprising the steps of
   A. filling a first of said working circuits with hydraulic liquid while maintaining the second of said working circuits in a pressurized condition, the duration of said filling being adjustable
   B. depressurizing said second working circuit subsequent to the completion of step (A) and
   C. triggering step (B) by the pressure which prevails in said first working circuit upon completion of step (A).

2. In a hydrodynamic vehicle transmission of the type that includes (A) at least one Föttinger torque converter for low and medium speeds of travel, (B) a Föttinger fluid coupling for high speeds of travel, (C) pressure generating pump means and (D) pressurizing conduit means connecting said pump means with said torque converter and said fluid coupling, the improvement comprising valve means in said pressurizing conduit means, said valve means movable into a first, second and third position; in said first position said valve means causing said pressurizing conduit means to be operatively connected solely to said torque converter, in said second position said valve means causing said pressurizing conduit means to be operatively connected to both said torque converter and said fluid coupling, in said third position said valve means causing said pressurizing conduit means to be operatively connected solely to said fluid coupling and causing depressurization of said torque converter, and said pressurizing conduit means including a pressure line extending from said valve means to said fluid coupling in which there is an adjustable throttle means to vary the flow passage section thereof for controlling the filling period of said fluid coupling when said valve means is in said second position.

3. An improvement as defined in claim 2, including manual means to shift said valve means from said first position into said second position and automatic means to shift said valve means from said second position into said third position in response to a predetermined pressure prevailing in said fluid coupling.

4. An improvement as defined in claim 2, wherein said valve means includes
   A. a cylinder,
   B. a main control piston reciprocable in said cylinder between said first, second and third positions,
   C. a shifting piston operatively connected in series with said main control piston and reciprocable therewith in said cylinder,
   D. a shift controller having a pressure conduit connected to a work chamber forming part of said cylinder to cause displacement of said pistons,
   E. a port being disposed in the lateral wall of said cylinder adjacent to said shifting piston, said port being closed by said shifting piston in its said first position and being open in said second and said third position of said shifting piston, said port connecting said work chamber with a discharge conduit, said port being further so positioned that a control edge of said main control piston affecting the filling of said fluid coupling opens a flow passage section ensuring a predetermined duration for the filling of said fluid coupling,
   F. a self-opening stop valve being disposed in said discharge conduit, and
   G. pressure signal transmitting conduit means connecting said fluid coupling with said stop valve, said pressure signal causing a shut-off of said stop valve upon termination of filling of said coupling.

5. An improvement as defined in claim 4, wherein said port is adjustable in the direction of piston movement.

* * * * *